United States Patent
Stevenson et al.

(10) Patent No.: US 7,465,473 B2
(45) Date of Patent: Dec. 16, 2008

(54) BONDING OF GRANULAR MATERIALS TO POLYOLEFIN SURFACES

(75) Inventors: Michael J. Stevenson, 460 Little Scout Rd., Sedona, AZ (US) 86336; Robert Alan Reeves, Cottonwood, AZ (US)

(73) Assignee: Michael J. Stevenson, Sedona, AZ (US)

( * ) Notice: Subject to any disclaimer, the term of this patent is extended or adjusted under 35 U.S.C. 154(b) by 0 days.

(21) Appl. No.: 10/667,746

(22) Filed: Sep. 22, 2003

(65) Prior Publication Data

US 2004/0058078 A1    Mar. 25, 2004

Related U.S. Application Data

(63) Continuation-in-part of application No. 09/909,066, filed on Jul. 20, 2001, now abandoned.

(51) Int. Cl.
*B05D 1/36* (2006.01)
(52) U.S. Cl. ...................................... 427/202
(58) Field of Classification Search ................ 427/470, 427/202, 204, 205, 163.4, 201
See application file for complete search history.

(56) References Cited

U.S. PATENT DOCUMENTS

| | | | |
|---|---|---|---|
| 2,628,172 A * | 2/1953 | Jenett | 427/375 |
| 3,450,571 A | 6/1969 | Zenczak | |
| 4,680,072 A | 7/1987 | Farrell | |
| 5,114,763 A * | 5/1992 | Brant et al. | 428/34.9 |
| 5,252,393 A * | 10/1993 | Kagota et al. | 428/349 |
| 5,681,217 A * | 10/1997 | Hoopman et al. | 451/528 |
| 6,042,894 A | 3/2000 | Goto et al. | |
| 6,569,494 B1 * | 5/2003 | Chambers et al. | 427/180 |

OTHER PUBLICATIONS

"Polymer Science Dictionary", 2nd edition, Mark Alger, p. 307, 1989.*

* cited by examiner

*Primary Examiner*—Fred J. Parker
(74) *Attorney, Agent, or Firm*—Robert E. Strauss

(57) ABSTRACT

A permanent, roughened or textured surface is applied to parts molded from polyolefins, particularly from polyethylene by applying to the surface of the part a coating mixture of a tackifier resin and polyolefin particles in a liquid carrier and incorporating a granular or particulate matter in the coating, either by application to the coating or by admixing the granular or particulate matter into the coating mixture. The coated surface is heated to the melt temperature of the polyolefin surface for a short time, sufficient to gel the polyolefin particles of the coating into the surface of the part, but insufficient to cause any thermal distortion of the part.

8 Claims, No Drawings

BONDING OF GRANULAR MATERIALS TO POLYOLEFIN SURFACES

RELATIONSHIP TO OTHER APPLICATIONS

This application is a continuation-in-part of our application, Ser. No. 09/909,066, filed Jul. 20, 2001, now abandoned.

BACKGROUND OF THE INVENTION

1. Field of Invention

This invention relates to surface treatment of polyolefin parts, in particular, to permanently bonding granular materials to surfaces of polyethylene parts such as containers and outdoor signs.

2. Brief Statement of the Prior Art

Polyolefin surfaces, particularly polyethylene surfaces, resist acceptance of coatings. These polymers are commonly used to form large, hollow-form parts such as outdoor signs, tanks and containers by rotational molding. The surfaces of these parts are smooth and difficult to coat.

In many instances, it is desirable to apply granular or particulate materials to the surfaces of such parts, e.g., containers which also function as steps need a roughened or abrasive texture and outdoor signs can be enhanced with reflective glass beads or microspheres.

U.S. Pat. No. 2,628,172 discloses a polyethylene dispersion which is coated onto a polyethylene surface and heated sufficiently to melt the coating, but not the polyethylene surface, to provide a coating with enhanced adhesion.

U.S. Pat. No. 5,840,142 discloses and claims a method for the permanent application of indicia to the surface of a molded polyethylene part using a transfer which is screen printed with a wax, polyethylene and pigment mixture. After application to the surface of a polyethylene part, the transfer is coated with a mixture of polyethylene and wax and the part is heated to fuse the coating and transfer into the surface of the part. Unfortunately, the method of this patent cannot be used to create a part with a roughened or textured surface, since the method achieves complete integration of the applied coatings into the surface of the part, forming a smooth clear surface.

OBJECTIVES OF THE INVENTION

It is an objective of this invention to provide a method to apply granular or particulate material to the surface of parts molded of polyolefins, particularly of polyethylene.

It is a further objective of this invention to provide permanently roughened or textured surfaces to parts molded from polyolefins, particularly from polyethylene.

It is an additional objective of this invention to provide a coating composition which is useful in the method for applying granular or particulate material to the surface of polyolefins, particularly of polyethylene.

Other and related objectives will be apparent from the following description of the invention.

BRIEF DESCRIPTION OF THE INVENTION

This invention is a method to impart a permanent, roughened or textured surface to parts molded from polyolefins, particularly from polyethylene. The method comprises coating the selected surface of the part with a coating mixture of a tackifier resin and polyolefin particles, preferably polyethylene particles, in a liquid carrier and incorporating a granular or particulate matter in the coating, either by application to the coating or by admixing the granular or particulate matter into the coating mixture. The coated surface of the polyolefin part is heated to the melt temperature of the polyolefin surface for a short time, sufficient to fuse the polyethylene particles of the coating into the surface of the part, but insufficient to cause any thermal distortion of the part. The heating permanently incorporates the coating into the surface of the part, with the granular solids bonded to the surface to impart a roughened or textured surface.

DESCRIPTION OF PREFERRED EMBODIMENTS

The invention is applicable to the treatment of surfaces of polyolefins such as polymers and copolymers of ethylene, propylene, butene, isobutene, with minor amounts of other comonomers such as vinyl acetate, vinyl chloride, etc. Polyethylene is the most common and advantageously treated polyolefin and is preferred, however, the surfaces of other polyolefins can be likewise treated.

The treatment of the invention is applicable to provide a roughened or textured surface to polyolefins in any form or shape, including films and sheets and molded objects such as containers, e.g., boxes, tanks, and outdoor signs, which are commonly rotationally molded from polyethylene.

The method employs a coating adhesive mixture which is applied to the polyolefin surface as a thin coating approximately several mils or less, preferably one mil, in thickness. The coating can be applied by any conventional method such as spraying, brushing, rolling, etc. Spraying is preferred for ease of application.

The active ingredients in the coating mixture are powders of a polyolefin, preferably polyethylene, and a tackifier. The polyethylene powder and tackifier are present in relative proportions of 15-30 weight parts tackifier and 85-70 weight parts polyethylene powder per 100 weight parts. These ingredients are dispersed in a suitable liquid carrier to permit application to the polyolefin surface. The liquid carrier can be water or a hydrocarbon solvent such as hexane or toluene.

The tackifier should be compatible with the polyolefin and preferably should be white to neutral in color to avoid staining the polyolefin surface. It should also have a softening temperature less than the melting temperature of the polyolefin, which for polyethylene should be less than 250 degrees F. Useful tackifiers include polyacrylic acid polyacrylates, polyurethanes, poly(vinyl)acetate and copolymers and mixtures thereof. Particularly preferred tackifiers are hydrocarbon resins such as aliphatic or cycloaliphatic petroleum resins from five carbon monomers containing minor amounts of aromatics, synthetic terpene resins, chlorinated polyolefins and hydrogenated rosin and rosin esters. The tackifier should have high heat and ultraviolet light stability and be soluble in hydrocarbon solvents or be readily emulsifiable in water. The softening point of the tackifier should be from 75 to 135 degrees F., preferably from 85 to 120 degrees F.

The polyolefin particle ingredient is used in a finely subdivided or powdered state with a particle size from less than 1 micron to about 140 microns, preferably from 5 to about 40 microns, maximum particle diameter. The density of the preferred polyethylene powder ranges from about 0.88 to 0.97 grams per cubic centimeter. Low, high and linear high density and high to ultrahigh molecular weight polyethylene, polypropylene, ethylene/vinyl acetate copolymers, and metallocene catalyst polyethylene can be used.

The coating mixture has sufficient liquid carrier to provide a solids content from 30 to about 50, preferably from 25 to 35, weight percent, and can be thinned with additional liquid carrier to provide an appropriate viscosity for application by spraying, brushing, rolling, or dipping of the polyethylene surface with the coating mixture.

When water is used as the liquid carrier, the active ingredients are dispersed in water with surface active agents which can include hydrocarbon silicone and fluorocarbon surfactants, non-ionic surfactants and ionic surfactants. Sufficient amounts of the surfactant are used to achieve a stable suspension of the ingredients in the aqueous mixture. Typically, the effective concentration of the surfactant will be from 0.1 to about 2 weight percent of the solids content in the aqueous mixture, depending on the particular surfactant which is used.

The granular solids can be of various sources, selected for the particular application. Examples of suitable materials include silica, e.g., sand, silicon carbide, aluminum oxide, aluminum silicates, garnet, etc. If skid resistance is desired, sand or garnet powders can be used. If an abrasive surface is desired, silicon carbide or alumina can be used. In some applications, a highly reflective surface may be desired and reflective glass beads or microspheres, or metal flakes can be used. The particle size of the granular solids can be varied considerably from 15 to about 300 mesh. The preferred size range is from 100 to about 300 mesh.

The granular solids can be admixed into the coating mixture when the mixture is applied by brushing, rolling or dipping. In such applications, the coating mixture can be loaded with granular solids in amounts of 5 to 50 weight percent, preferably 15 to 30 weight percent. When the coating mixture is applied by spraying, the granular solids are spread across the wetted surface of the polyethylene part by dusting or other suitable techniques that will ensure uniform distribution of the solids.

The coated surface is then heated to raise the temperature of the coating and outer skin of the surface to the melt temperature of the polyolefin surface, fusing the powders and tackifier into the outer skin of the polyolefin surface. To obtain fusion of the coating into the surface of the polyolefin part, the temperature of the surface must be raised to the melt temperature of the polyolefin part, thereby permitting diffusion of the melted coating into the melted surface. The granular solids are thereby encased in the outer skin of the polyolefin part, yet protrude from the surface of the part to impart a roughened texture to the surface. In a typical application, the coated polyolefin surface is heated to a temperature from 250 to about 350 degrees F., taking care to avoid excessive temperatures or temperature differentials which could cause the polyolefin part to distort or warp.

The heating can be accomplished using a suitable radiant source such as an open flame or a high temperature electrical heater, e.g., an infrared heater. Infrared heating is preferred because it affords a closer control of the temperatures and avoids any possibility of degradation of the polyolefin surface by oxidation. The heating step is practiced to apply heat locally to the coated polyethylene surface sufficiently to fuse the coating into the surface of the polyolefin part, a condition which is reached when the coated surface appears to be clear of any cloudiness. Thereafter, the polyolefin part is cooled to ambient temperature.

The invention is further described and illustrated in the following example.

EXAMPLE

A battery container having a cover approximately two by three feet in area and obtained by rotationally molding from polyolefin is treated by the invention to provide skid resistance suitable for use as a step. A coating mixture of active ingredients comprising 30 weight percent of an aromatic modified C5 aliphatic hydrocarbon resin and 70 weight percent polyethylene powders was used to coat the outer surface of the container cover. The polyethylene powder was high density polyethylene with a size range from 1 to 80 microns. The active ingredients were dispersed in toluene at a concentration of 25 weight percent and were sprayed onto the polyethylene surface sufficiently to form a continuous film over the surface. A pumice aggregate containing 70 weight percent silica with a size range from 15 to 100 mesh was dusted over the wet surface of the coating and a second coating of the coating mixture was sprayed over the surface. The coating was permitted to dry and then the surface was heated to approximately 250 degrees F., sufficiently to fuse the coating into the outer skin of the polyethylene surface. After cooling the granular solids were observed to have imparted a permanent, roughened texture to the polyethylene surface.

The invention has been described with reference to the illustrated and presently preferred embodiment. It is not intended that the invention be unduly limited by this disclosure of the preferred embodiment. Instead, it is intended that the invention be defined by the method steps and ingredients, and their obvious equivalents, set forth in the claims.

What is claimed is:

1. A method of treating a surface of a polyethylene object to obtain a permanently textured surface which comprises:
   a. coating a selected surface of said polyethylene object with a mixture of an aliphatic or cycloaliphatic hydrocarbon tackifier resin and polyethylene powder in a liquid carrier to obtain a coated selected surface of said polyethylene object;
   b. incorporating inorganic particulate solids having a size range passing a 15 mesh standard screen size into the coating;
   c. drying the coating and applying radiant heat locally to said coated polyethylene selected surface for a time sufficient to melt said coating and said selected surface and fuse the coating into said selected surface of the polyethylene object but insufficient to cause thermal distortion of the polyethylene object.

2. The method of claim 1 wherein the particles of the polyethylene powder have a size range less than 140 microns.

3. The method of claim 1 wherein said tackifier resin and polyethylene powder are present in proportions from 15 to 30 weight percent tackifier and from 85 to 70 weight percent polyethylene powder.

4. The method of claim 3 wherein said liquid carrier is water and including sufficient surfactant to disperse components.

5. The method to prepare a permanently textured surface on a polyethylene object which comprises:
   a. coating a selected surface of said polyethylene object with a mixture of an aliphatic or cycloaliphatic hydrocarbon tackifier resin and polyethylene powder in proportions from 15 to 30 weight percent tackifier resin and from 85 to 70 weight percent polyethylene powder in a liquid carrier to obtain a coated selected surface of said polyethylene object;
   b. incorporating inorganic solids having a size range passing a 15 mesh standard screen size into the coating;
   c. applying radiant heat locally to said coated, selected surface to raise the temperature of said coated polyethylene surface to a temperature of 250° to 350° F. and for sufficient time to melt said coating and said selected surface and fuse the coating into said selected surface without causing the object to distort or warp.

6. The method of claim 5 wherein the particles of the polyethylene powder have a size range less than 140 microns.

7. The method of claim 5 wherein said liquid carrier is a hydrocarbon solvent.

8. The method of claim 5 wherein said liquid carrier is water and including sufficient surfactant to disperse components.

* * * * *